(12) United States Patent
Khan et al.

(10) Patent No.: US 12,129,198 B2
(45) Date of Patent: Oct. 29, 2024

(54) METHOD OF SINTERING GLASS PREFORM WITH REDUCED HELIUM CONSUMPTION

(71) Applicant: Sterlite Technologies Limited, Gurgaon (IN)

(72) Inventors: Amjad Khan, Gurgaon (IN); Sudhakar Reddy, Gurgaon (IN); Samir Bhongade, Gurgaon (IN); Chitra D, Gurgaon (IN)

( * ) Notice: Subject to any disclaimer, the term of this patent is extended or adjusted under 35 U.S.C. 154(b) by 486 days.

(21) Appl. No.: 17/214,856

(22) Filed: Mar. 27, 2021

(65) Prior Publication Data

US 2021/0387893 A1 Dec. 16, 2021

(30) Foreign Application Priority Data

Jun. 16, 2020 (IN) .............................. 202011025329

(51) Int. Cl.
*C03B 37/014* (2006.01)
(52) U.S. Cl.
CPC .............................. *C03B 37/01446* (2013.01)
(58) Field of Classification Search
CPC ............................................... C03B 37/01446
See application file for complete search history.

(56) References Cited

U.S. PATENT DOCUMENTS 5,713,979 A * 2/1998 Nicholson ........... C03B 37/0146
65/540

FOREIGN PATENT DOCUMENTS

JP 2000034131 A * 2/2000 ......... C03B 37/0142

OTHER PUBLICATIONS

Translation of JP 2000-034131 (Year: 2000).*

* cited by examiner

*Primary Examiner* — Cynthia Szewczyk
(74) *Attorney, Agent, or Firm* — Steven R. Fairchild; Michael J. Pennington

(57) ABSTRACT

A method for sintering of a glass preform with reduced helium gas consumption and with reduced cost without affecting any optical or other parameter of the fiber obtained from glass preform processed in this way. The method includes a first step to perform dehydration of the glass preform inside a dehydration module, a second step to perform down-feeding of the glass preform inside a sintering furnace, a third step to perform sintering of the glass preform inside the sintering furnace, a fourth step to move the glass preform in upward motion, and a fifth step to perform re-sintering of the glass preform inside the sintering furnace. Also, the glass preform undergoes dehydration for time period in range of about 20 minutes to 120 minutes. Also, dehydration of the glass preform is performed in presence of helium gas.

15 Claims, 8 Drawing Sheets

300

400

600

800

METHOD OF SINTERING GLASS PREFORM WITH REDUCED HELIUM CONSUMPTION

BACKGROUND OF THE INVENTION

Field of the Invention

The present disclosure relates to the field of optical fibre and in particular, relates to a method of sintering glass preform with reduced helium consumption.

Description of Prior Art

With the advancement of science and technology, various modern technologies are being employed for communication purposes. One of the most important modern communication technologies is optical fibre. In general, optical fibre is a flexible, transparent fibre made by drawing glass (silica) or plastic to a diameter slightly thicker than that of a human hair. The glass optical fibre is made from glass "preform". This preform is sintered soot deposited on bait rod. The sintering of the soot preform produces a dense and non-porous glass preform. Conventionally, sintering of the preform is performed using high consumption of helium. However, high consumption of helium increases over all cost of the manufacturing process as helium is costlier than other inert gases like argon and nitrogen. In addition, helium consumption in sintering is 390 to 430 times volume of soot at existing level. Further, helium is non-renewable natural resource and is depleting with time. Furthermore, cost and supply of helium is controlled by foreign countries which makes us dependent.

In light of the above stated discussion, there is a need of an advanced method for sintering of a glass preform that overcomes the above stated drawbacks.

SUMMARY OF THE INVENTION

In an aspect, the present disclosure provides a method for sintering of a glass preform with reduced helium gas consumption. The method includes a first step to perform dehydration of the soot preform inside a dehydration module. In addition, the method includes a second step to perform down-feeding of the glass preform inside a sintering furnace. Further, the method includes a third step to perform sintering of the glass preform inside the sintering furnace. Furthermore, the method includes a fourth step to move the glass preform in upward motion. Also, the glass preform undergoes dehydration for time period in range of about 20 minutes to 120 minutes. Dehydration of the glass preform is performed in presence of chlorine gas or mixture of chlorine and other inert gases. Also, down-feeding of the glass preform is done for about 10 minutes. Also, sintering of the glass preform is done in one or more sintering stages. The one or more sintering stages include but may not be limited to first sintering stage, second sintering stage, and third sintering stage and so on. Also, the glass preform undergoes upward motion for about 1 minute. Also, the glass preform undergoes re-sintering for about 10 to 25 minutes.

A primary object of the present disclosure is to provide a method for sintering of a glass preform with reduced helium gas consumption.

Another object of the present disclosure is to provide the glass preform with reduced cost.

Yet another object of the present disclosure is to provide the method to reduce helium gas consumption by 30 percent without affecting any optical or other parameter of the fiber obtained from glass preform processed in this way.

In an embodiment of the present disclosure, the dehydration module is utilized to perform dehydration of the glass preform in presence of helium gas.

In an embodiment of the present disclosure, the sintering furnace is utilized to perform sintering of the glass preform in presence of helium gas.

In an embodiment of the present disclosure, rate of flow of helium gas during dehydration of the glass preform is about 5 to 40 standard liter per minute for time period in range of about 20 minutes to 120 minutes.

In an embodiment of the present disclosure, the glass preform is kept inside the sintering furnace at temperature of about 1200° to 1400° Celsius for about 20 to 60 mins.

In an embodiment of the present disclosure, the glass preform is moving in the sintering furnace for about 5 to 10 minutes.

In an embodiment of the present disclosure, the glass preform undergoes first sintering stage for about 120 to 160 minutes.

In an embodiment of the present disclosure, the glass preform is fed with helium gas during dehydration and sintering in semi-continuous way.

In an embodiment of the present disclosure, the glass preform undergoes second sintering stage for about 100 to 150 minutes.

In an embodiment of the present disclosure, the glass preform undergoes third sintering stage for about 80 to 100 minutes.

BRIEF DESCRIPTION OF DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
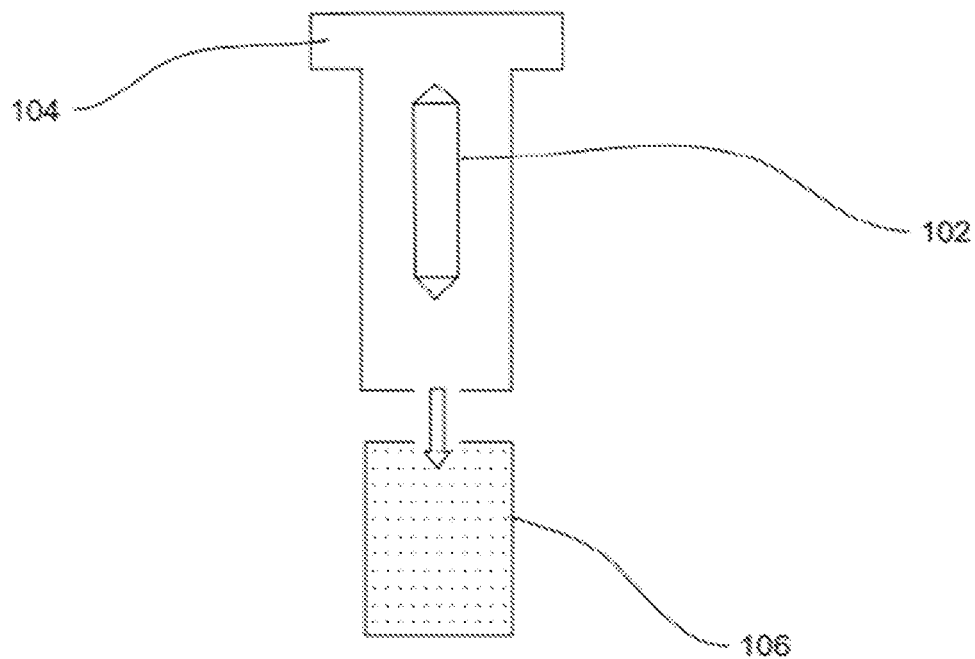
FIG. 1 illustrates a general overview of a system for sintering of a glass preform, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. The system.
102. The glass preform.
104. The dehydration module.
106. The sintering furnace.
200. Flow chart.
202. Step 202.
204. Step 204.
206. Step 206.
208. Step 208.
210. Step 210.
212. Step 212.
214. Step 214.
300. Graph.
400. Graph.
500. Graph.
600. Graph.
700. Graph.
800. Graph.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is a general overview of a system 100 for sintering of a glass preform 102, in accordance with various embodiments of the present disclosure. The system 100 includes the glass preform 102, a dehydration module 104, and a sintering furnace 106.

The system 100 includes the glass preform 102. In general, glass preform is cylindrical body having core structure and cladding structure. In addition, glass preform is material used for fabrication of optical fibres.

In an embodiment of the present disclosure, the glass preform 102 is manufactured using OVD process. In general, OVD refers to outside vapor deposition. In addition, outside vapor deposition (OVD) is process in which glass preform is manufactured by depositing silica soot on surface of some target rod.

In another embodiment of the present disclosure, the glass preform 102 is manufactured using VAD process. In general, VAD process refers to as vapor axial deposition (VAD) process. In addition, vapor axial deposition process is used to manufacture porous glass preform. Further, vapor axial deposition process facilitates fabrication of porous glass preform by depositing fine glass material onto end surface of starting material through flame hydrolysis. Furthermore, starting material is pulled upward in axial direction and porous glass preform is grown in the same direction. Moreover, starting material is volatile organic compound that includes but may not be limited to $SiCl_4$, $GeCl_4$ and $O_2$. Also, porous glass preform is heated to manufacture transparent fiber preform.

In yet another embodiment of the present disclosure, the glass preform 102 is manufactured using ACVD process. In general, ACVD process refers to atmospheric chemical vapor deposition process.

In yet another embodiment of the present disclosure, the glass preform 102 is manufactured using PCVD process. In general, PCVD process refers to plasma chemical vapor deposition process.

In an embodiment of the present disclosure, the glass preform 102 is manufactured by depositing silica soot over glass body. In general, silica soot is powdery or flaky substance consists largely of amorphous carbon and produced by incomplete burning of organic matter. In an example, glass body is mounted on lathe. In addition, lathe is machine tool that rotates glass body about axis of rotation to perform various operations. Further, various operations performed by lathe are cutting, drilling, knurling, deformation, and the like. Furthermore, glass body is placed on heat source and reacts with gases.

In an example, the glass preform 102 is manufactured by depositing silica soot over glass body. In addition, silica soot deposited over glass body is densified above glass transition temperature. In another example, the glass preform 102 is manufactured in non-vacuum environment. In addition, non-vacuum environment consolidates silica soot over glass body in presence of inert gases with high thermal conductivity. Further, inert gases include helium, argon and the like. Furthermore, inert gases are used for thermal diffusion inside porous soot surface.

The system 100 includes the dehydration module 104. The dehydration module 104 is utilized to perform dehydration of the glass preform 102. In general, dehydration corresponds to drying of glass preform. In addition, dehydration removes water and other impurities from glass preform. Further, dehydration refers to removal of OH ion content from glass preform. In an embodiment of the present disclosure, dehydration of the glass preform 102 is performed inside the dehydration module 104 in presence of chlorine or mixture of chlorine and inert gas. In another embodiment of the present disclosure, dehydration of the glass preform 102 is performed inside the dehydration module 104 in presence of argon gas. In yet another embodiment of the present disclosure, dehydration of the glass preform 102 is performed inside the dehydration module 104 in presence of any suitable gaseous atmosphere.

The system 100 includes the sintering furnace 106. The sintering furnace 106 is utilized to perform sintering of the glass preform 102. Further, sintering of the glass preform 102 causes shrinkage during glass transition temperature. Furthermore, sintering reduces porosity of the glass preform 102. In addition, the glass preform 102 undergoes down-feeding into the sintering furnace 106. In an embodiment of the present disclosure, the down-feeding of the glass preform 102 into the sintering furnace 106 is performed in presence of helium gas. The down-feeding of the glass preform 102 into the sintering furnace 106 facilitates sintering of the glass preform 102. In an embodiment of the present disclosure, the sintering furnace 106 receives helium gas at flow rate in range of about 20 standard litre per minute to 40 standard litre per minute during sintering of the glass preform 102. In another embodiment of the present disclosure, range of flow rate of helium gas in the sintering furnace 106 may vary. In another embodiment of the present disclosure, consumption of helium gas during sintering of the glass preform 102 may vary. In an embodiment of the present disclosure, flow of helium gas inside the sintering furnace 106 is done in semi-continuous way.

Figure 2:
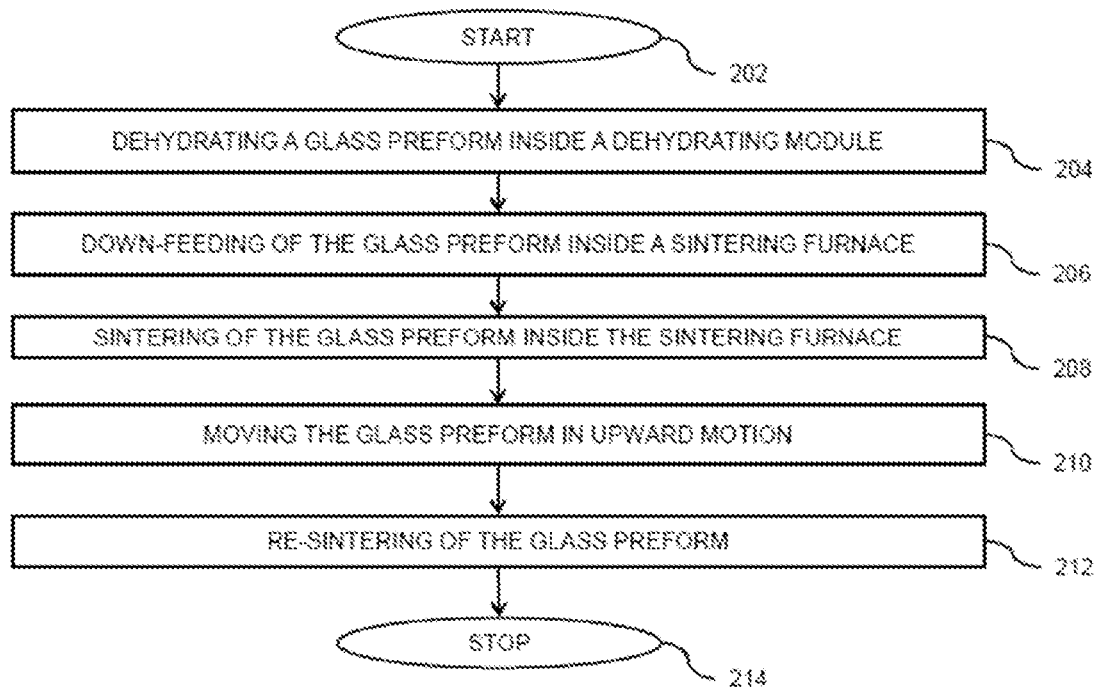
FIG. 2 illustrates a flowchart describing a method for sintering of the glass preform, in accordance with various embodiments of the present disclosure.

According to FIG. 2, this is a flow chart 200 describing steps to manufacture the glass preform 102, in accordance with various embodiments of the present disclosure. The flow chart 200 initiates at step 202. Following step 202, at step 204, dehydration of the glass preform 102 is performed inside the dehydration module 104. In an embodiment of the present disclosure, the glass preform 102 undergoes dehydration for time period in range of about 20 minutes to 120 minutes. In another embodiment of the present disclosure, time period for dehydration of the glass preform 102 may vary. In an embodiment of the present disclosure, rate of flow of helium gas during dehydration of the glass preform 102 is about 35 standard litre per minute for time period in range of about 20 minutes to 40 minutes. In another embodiment of the present disclosure, rate of flow of helium gas during dehydration of the glass preform 102 may vary.

In an embodiment of the present disclosure, dehydration of the glass preform 102 is performed in presence of helium gas. In another embodiment of the present disclosure, dehydration of the glass preform 102 is performed in presence of any suitable inert gas.

At step 206, the glass preform 102 undergoes down-feeding into the sintering furnace 106. In an embodiment of the present disclosure, time taken by the glass preform 102 to reach the sintering furnace 106 is about 10 minutes. In another embodiment of the present disclosure, time taken by the glass preform 102 to reach the sintering furnace 106 may vary. In an embodiment of the present disclosure, the glass preform 102 undergoes down-feeding inside the sintering furnace 106. In an embodiment of the present disclosure, rate of flow of helium gas during down-feeding of the glass preform 102 is about 35 standard litre per minute. In another embodiment of the present disclosure, rate of flow of helium gas during down-feeding of the glass preform 102 may vary.

In an embodiment of the present disclosure, the glass preform 102 is kept inside the sintering furnace 106 at temperature of about 1400° Celsius. In another embodiment of the present disclosure, temperature of the glass preform 102 inside sintering furnace 106 may vary. In an embodiment of the present disclosure, the glass preform 102 is kept at temperature 1400° Celsius for time period of about 40 minutes. In another embodiment of the present disclosure, time to maintain temperature of the glass preform 102 at 1400° Celsius may vary. In an embodiment of the present disclosure, the glass preform 102 is feed with helium gas at temperature 1400° Celsius. In an embodiment of the present disclosure, rate of flow of helium gas towards the glass preform 102 at temperature 1400° Celsius is about 25 to 40 standard liter per minute. In another embodiment of the present disclosure, rate of flow of helium gas towards the glass preform 102 may vary.

In an embodiment of the present disclosure, the glass preform 102 is moving in the sintering furnace 106 for time period of about 5 to 10 minutes. In another embodiment of the present disclosure, time period to move the glass preform 102 in the sintering furnace 106 may vary. In an embodiment of the present disclosure, the glass preform 102 moves inside the sintering furnace 106 in presence of helium gas.

At step 208, the glass preform 102 undergoes sintering inside the sintering furnace 106. In an embodiment of the present disclosure, sintering of the glass preform 102 is performed in one or more sintering stages. In an embodiment of the present disclosure, the one or more sintering stages include but may not be limited to first sintering stage, second sintering stage, and third sintering stage. In an embodiment of the present disclosure, the glass preform 102 undergoes first sintering stage. In an embodiment of the present disclosure, the glass preform 102 undergoes first sintering stage for time period of about 150 to 200 minutes. In another embodiment of the present disclosure, time period for sintering of the glass preform 102 at first sintering stage may vary. In an embodiment of the present disclosure, rate of flow of helium gas during first sintering stage is about 25 to 40 standard liter per minute. In another embodiment of the present disclosure, rate of flow of helium gas during first sintering stage may vary.

In an embodiment of the present disclosure, the glass preform 102 undergoes second sintering stage. In an embodiment of the present disclosure, the glass preform 102 undergoes second sintering stage for time period of about 114.6 minutes. In another embodiment of the present disclosure, time period for sintering the glass preform 102 during second sintering stage for may vary. In an embodiment of the present disclosure, rate of flow of helium gas during second sintering stage is about 35 standard litre per minute. In another embodiment of the present disclosure, rate of flow of helium gas during second sintering stage may vary.

In an embodiment of the present disclosure, the glass preform 102 undergoes third sintering stage. In an embodiment of the present disclosure, the glass preform 102 undergoes third sintering stage for time period of about 94.1 minutes. In another embodiment of the present disclosure, time period for sintering of the glass preform 102 during third sintering stage may vary. In an embodiment of the present disclosure, rate of flow of helium gas during third sintering stage is about 35 standard litre per minute. In another embodiment of the present disclosure, rate of flow of helium gas during third sintering stage may vary.

At step 210, the glass preform 102 undergoes upward motion after the one or more sintering stages. In an embodiment of the present disclosure, the glass preform 102 undergoes upward motion for time period of about 1 minute. In another embodiment of the present disclosure, time period for upward motion of the glass preform 102 may vary. In an embodiment of the present disclosure, the glass preform 102 is feed with helium gas during upward motion. In an embodiment of the present disclosure, rate of flow of helium during upward motion is about 35 standard litre per minute. In another embodiment of the present disclosure, rate of flow of helium gas during upward motion may vary.

At step 212, the glass preform 102 undergoes re-sintering. In an embodiment of the present disclosure, the glass preform 102 undergoes re-sintering for time period of about 22.7 minutes. In another embodiment of the present disclosure, time period for re-sintering of the glass preform 102 may vary. In an embodiment of the present disclosure, rate of flow of helium gas during re-sintering of the glass preform 102 is about 35 standard litre per minute. In another embodiment of the present disclosure, rate of flow of helium gas during re-sintering of the glass preform 102 may vary. The flow chart terminates at step 214.

Figure 3:
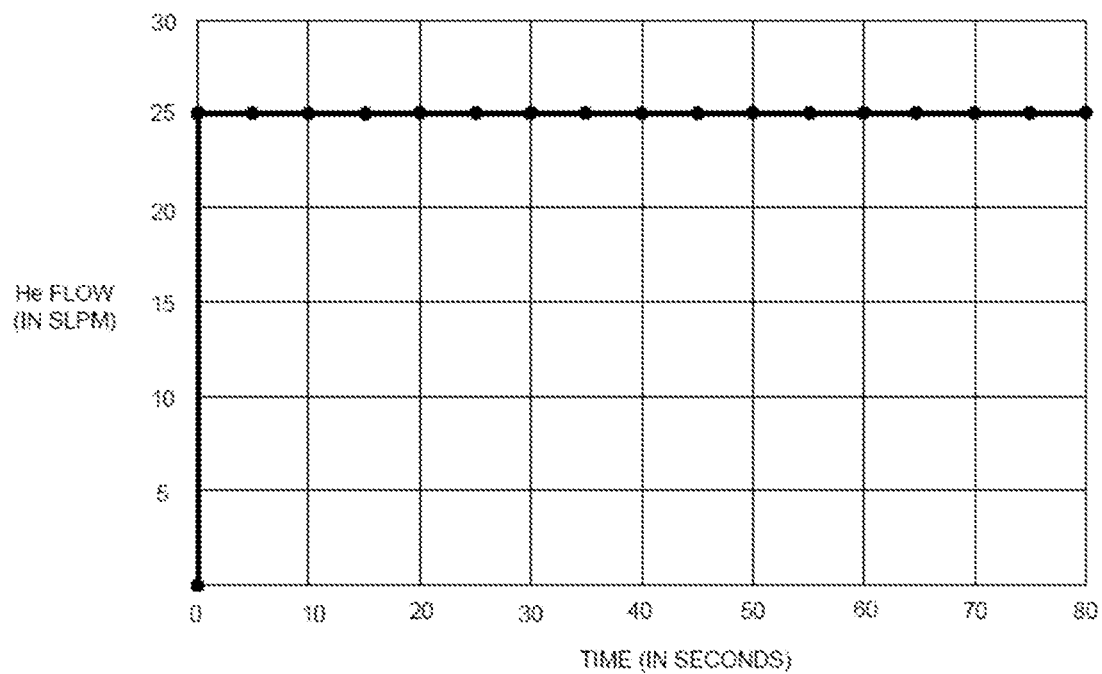
FIG. 3 illustrates a graph for flow pattern of helium gas consumption during dehydration and sintering of the glass preform, in accordance with an embodiment of the present disclosure.

According to FIG. 3, this is a graph 300 for flow pattern of helium gas consumption during dehydration and sintering of the glass preform 102, in accordance with an embodiment of the present disclosure. In an embodiment of the present disclosure, the graph 300 describes flow pattern of helium gas during dehydration and sintering of the glass preform 102. In addition, helium gas is introduced in continuous way. In an embodiment of the present disclosure, rate of flow of helium gas as shown in the graph 300 is about 25 standard litre per minute for any particular time. In another embodiment of the present disclosure, rate of flow of helium gas may vary for any particular time.

Figure 4:
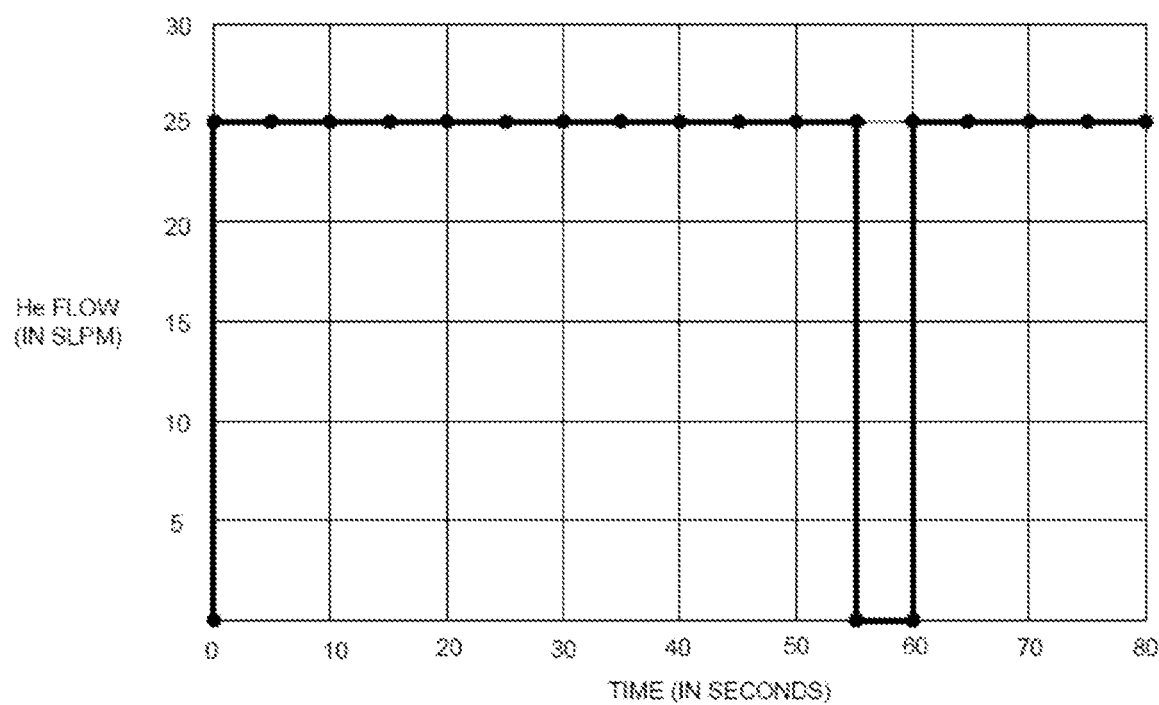
FIG. 4 illustrates the graph for flow pattern of helium gas consumption during dehydration and sintering of the glass preform, in accordance with another embodiment of the present disclosure.

According to FIG. 4, this is a graph 400 for flow pattern of helium gas consumption during dehydration and sintering of the glass preform 102, in accordance with an embodiment of the present disclosure. In an embodiment of the present disclosure, the graph 400 describes flow pattern of helium gas during dehydration and sintering of the glass preform 102. In addition, helium gas is introduced in semi-continuous way. In an embodiment of the present disclosure, flow of helium gas for time in between 0 seconds to 55 seconds is 25 standard litre per minute. In addition, flow of helium gas is halt for time in between 55 seconds to 60 seconds as shown in the graph 400. Further, flow of helium gas for time in between 60 seconds to 80 seconds is 25 standard litre per minute. In an embodiment of the present disclosure, helium gas consumption in semi-continuous way reduces overall consumption of helium gas during dehydration and sintering of the glass preform 102.

Figure 5:
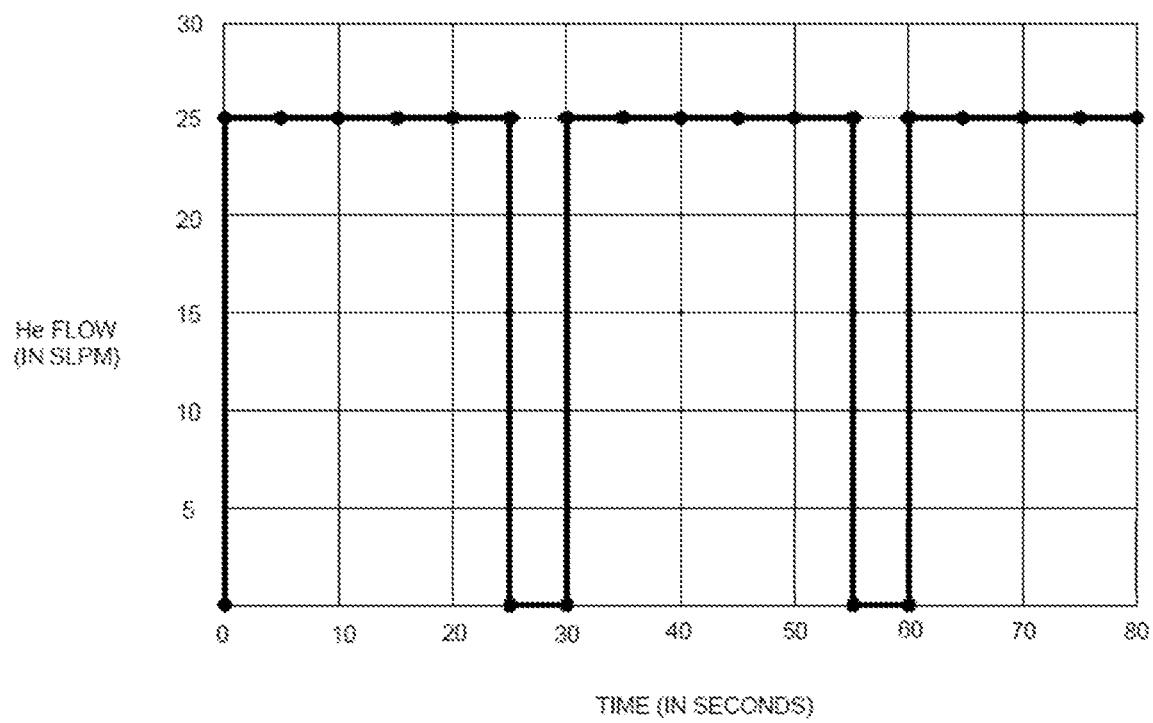
FIG. 5 illustrates the graph for flow pattern of helium gas consumption during dehydration and sintering of the glass preform, in accordance with yet another embodiment of the present disclosure.

According to FIG. 5, this is a graph 500 for flow pattern of helium gas consumption during dehydration and sintering of the glass preform 102, in accordance with an embodiment of the present disclosure. In an embodiment of the present disclosure, the graph 500 describes flow pattern of helium gas during dehydration and sintering of the glass preform 102. In addition, helium gas is introduced in semi-continuous way. In an embodiment of the present disclosure, flow of helium gas for time in between 0 seconds to 25 seconds is 25 standard litre per minute. In addition, flow of helium gas is halt for time in between 25 seconds to 30 seconds as shown in the graph 400. Further, helium gas is re-introduced with flow of about 25 standard litre per minute for time in between 30 seconds to 55 seconds. Furthermore, flow of helium gas is halt for time in between 55 seconds to 60 seconds. Moreover, helium gas is re-introduced for time in between 60 seconds to 80 seconds with flow of 25 standard litre per minute.

Figure 6:
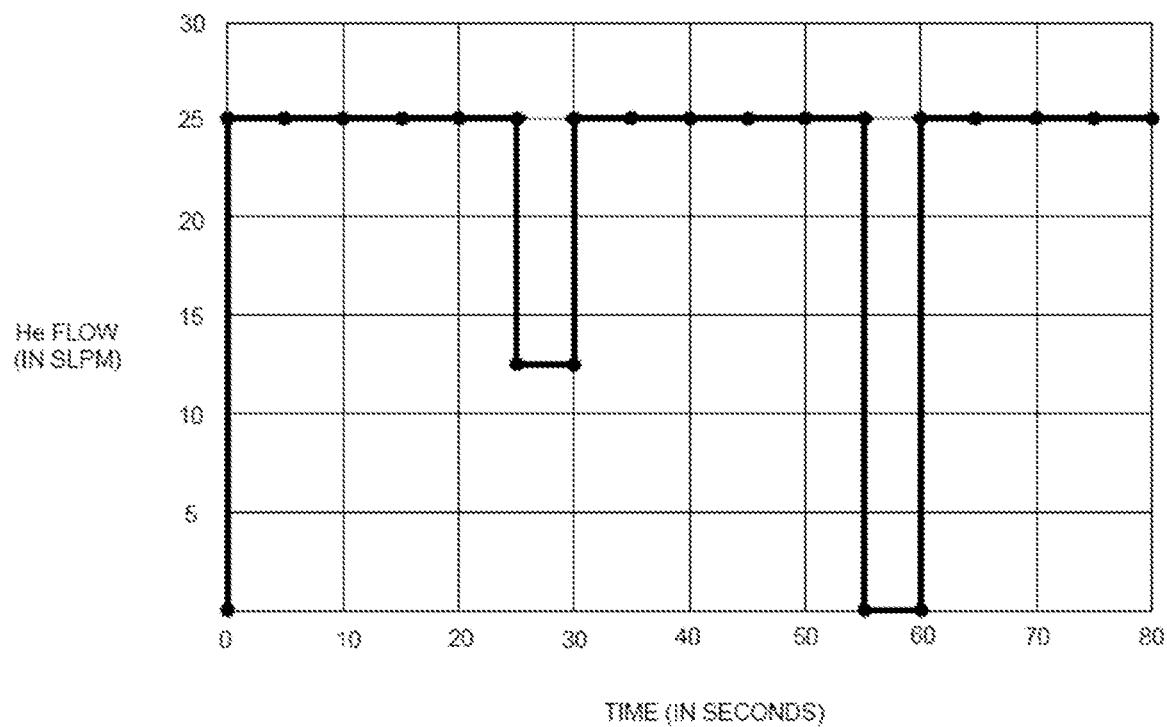
FIG. 6 illustrates the graph for flow pattern of helium gas consumption during dehydration and sintering of the glass preform, in accordance with yet another embodiment of the present disclosure.

According to FIG. 6, this is a graph 600 for flow pattern of helium gas consumption during dehydration and sintering of the glass preform 102, in accordance with an embodiment of the present disclosure. In an embodiment of the present disclosure, the graph 600 describes flow pattern of helium gas during dehydration and sintering of the glass preform 102. In addition, helium gas is introduced in non-continuous way. In an embodiment of the present disclosure, flow of helium gas for time in between 0 seconds to 25 seconds is 25 standard litre per minute. In addition, flow of helium gas is reduced to 12.5 standard litre per minute for time in between 25 seconds to 30 seconds. Further, helium gas is re-introduced with flow of about 25 standard litre per minute for time in between 30 seconds to 55 seconds. Furthermore, flow of helium gas is halt for time in between 55 seconds to 60 seconds. Moreover, helium gas is re-introduced for time in between 60 seconds to 80 seconds with flow of 25 standard litre per minute. In an embodiment of the present disclosure, helium gas consumption in non-continuous way reduces overall consumption of helium gas during dehydration and sintering of the glass preform 102.

Figure 7:
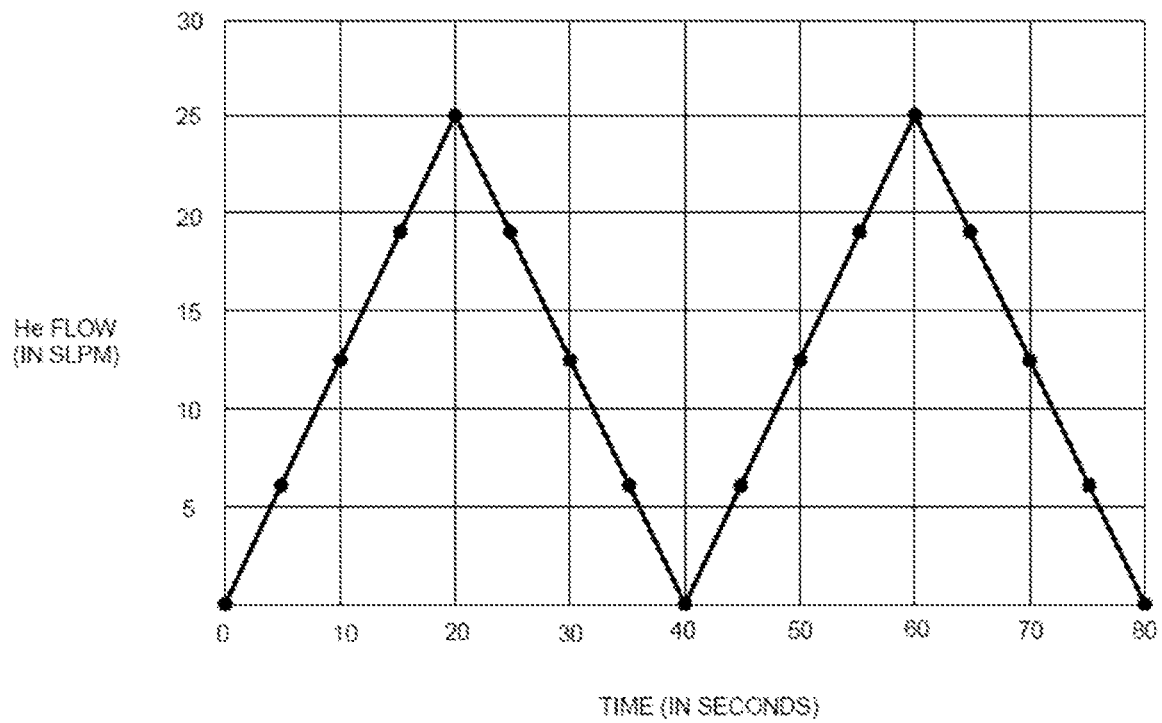
FIG. 7 illustrates the graph for flow pattern of helium gas consumption during dehydration and sintering of the glass preform, in accordance with yet another embodiment of the present disclosure.

According to FIG. 7, this is a graph 700 for flow pattern of helium gas consumption during dehydration and sintering of the glass preform 102, in accordance with an embodiment of the present disclosure. In an embodiment of the present disclosure, the graph 700 describes flow pattern of helium gas during dehydration and sintering of the glass preform 102. In addition, helium gas is introduced in non-continuous way. In an embodiment of the present disclosure, rate of flow of helium gas during dehydration and sintering of the glass preform 102 is defined by threshold value. In addition, threshold value for helium gas is 25 standard litre per minute. In an embodiment of the present disclosure, flow of helium gas for time in between 0 seconds to 5 seconds is 6.25 standard litre per minute. In an embodiment of the present disclosure, flow of helium gas for time in between 5 seconds to 10 seconds is 12.5 standard litre per minute. In an embodiment of the present disclosure, flow of helium gas for time in between 10 seconds to 15 seconds is 18.75 standard litre per minute. In an embodiment of the present disclosure, flow of helium gas for time in between 15 seconds to 20 seconds is 25 standard litre per minute.

In an embodiment of the present disclosure, flow of helium gas for time in between 20 seconds to 25 seconds is 18.75 standard litre per minute. In an embodiment of the present disclosure, flow of helium gas for time in between 25 seconds to 30 seconds is 12.5 standard litre per minute. In an embodiment of the present disclosure, flow of helium gas for time in between 30 seconds to 35 seconds is 6.25 standard litre per minute. In an embodiment of the present disclosure, flow of helium gas for time in between 35 seconds to 40 seconds is 0 standard litre per minute.

In an embodiment of the present disclosure, flow of helium gas for time in between 40 seconds to 45 seconds is 6.25 standard litre per minute. In an embodiment of the present disclosure, flow of helium gas for time in between 45 seconds to 50 seconds is 12.5 standard litre per minute. In an embodiment of the present disclosure, flow of helium gas for time in between 50 seconds to 55 seconds is 18.75 standard litre per minute. In an embodiment of the present disclosure, flow of helium gas for time in between 55 seconds to 60 seconds is 25 standard litre per minute.

In an embodiment of the present disclosure, flow of helium gas for time in between 60 seconds to 65 seconds is 18.75 standard litre per minute. In an embodiment of the present disclosure, flow of helium gas for time in between 65 seconds to 70 seconds is 12.5 standard litre per minute. In an embodiment of the present disclosure, flow of helium gas for time in between 70 seconds to 75 seconds is 6.25 standard litre per minute. In an embodiment of the present disclosure, flow of helium gas for time in between 75 seconds to 80 seconds is 0 standard litre per minute.

Figure 8:
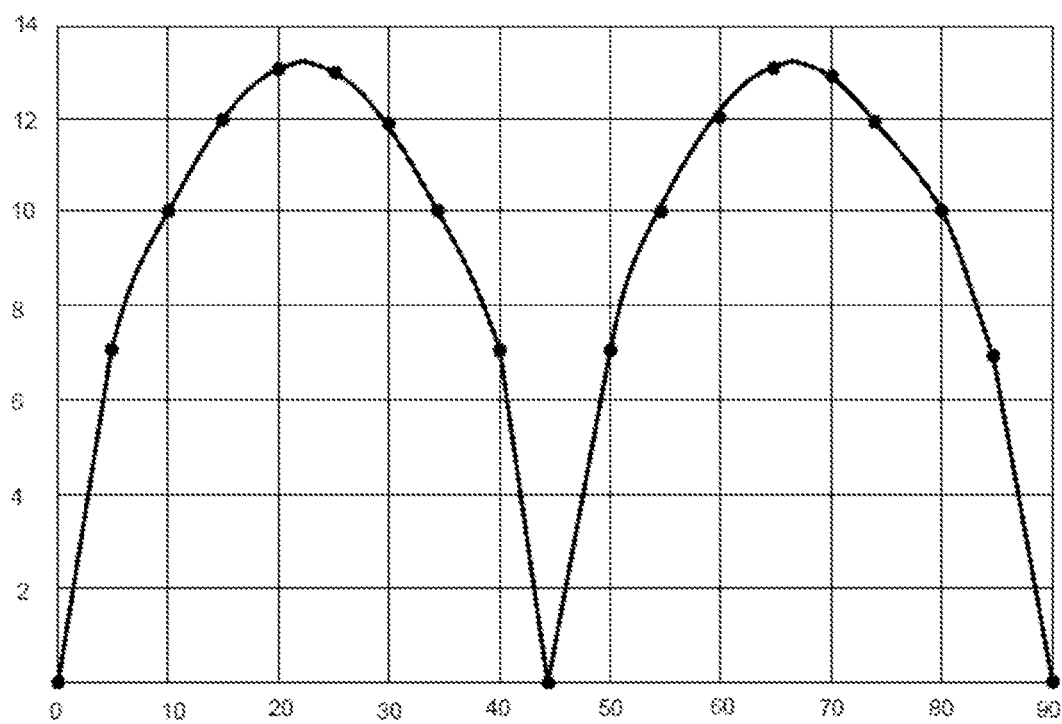
FIG. 8 illustrates the graph for flow pattern of helium gas consumption during dehydration and sintering of the glass preform, in accordance with yet another embodiment of the present disclosure.

According to FIG. 8, this is a graph 800 for flow pattern of helium gas consumption during dehydration and sintering of the glass preform 102, in accordance with an embodiment of the present disclosure. In an embodiment of the present disclosure, the graph 800 describes flow pattern of helium gas during dehydration and sintering of the glass preform 102. In addition, helium gas is introduced in non-continuous way. In an embodiment of the present disclosure, flow of helium gas for time in between 0 seconds to 5 seconds is 7 standard liter per minute. In an embodiment of the present disclosure, flow of helium gas for time in between 5 seconds to 10 seconds is 10 standard litre per minute. In an embodiment of the present disclosure, flow of helium gas for time in between 10 seconds to 15 seconds is 12 standard litre per minute. In an embodiment of the present disclosure, flow of helium gas for time in between 15 seconds to 20 seconds is 13 standard litre per minute.

In an embodiment of the present disclosure, flow of helium gas for time in between 20 seconds to 25 seconds is 13 standard litre per minute. In an embodiment of the present disclosure, flow of helium gas for time in between 25 seconds to 30 seconds is 12 standard litre per minute. In an embodiment of the present disclosure, flow of helium gas for time in between 30 seconds to 35 seconds is 10 standard litre per minute. In an embodiment of the present disclosure, flow of helium gas for time in between 35 seconds to 40 seconds is 7 standard litre per minute. In an embodiment of the present disclosure, flow of helium gas for time in between 40 seconds to 45 seconds is 0 standard litre per minute.

In an embodiment of the present disclosure, flow of helium gas for time in between 45 seconds to 50 seconds is 7 standard litre per minute. In an embodiment of the present disclosure, flow of helium gas for time in between 50 seconds to 55 seconds is 10 standard litre per minute. In an embodiment of the present disclosure, flow of helium gas for time in between 55 seconds to 60 seconds is 12 standard litre per minute. In an embodiment of the present disclosure, flow of helium gas for time in between 60 seconds to 65 seconds is 13 standard litre per minute.

In an embodiment of the present disclosure, flow of helium gas for time in between 65 seconds to 70 seconds is 13 standard litre per minute. In an embodiment of the present disclosure, flow of helium gas for time in between 70 seconds to 75 seconds is 12 standard litre per minute. In an embodiment of the present disclosure, flow of helium gas for time in between 75 seconds to 80 seconds is 10 standard litre per minute. In an embodiment of the present disclosure, flow of helium gas for time in between 80 seconds to 85 seconds is 7 standard litre per minute. In an embodiment of the present disclosure, flow of helium gas for time in between 85 seconds to 90 seconds is 0 standard litre per minute. In an embodiment of the present disclosure, helium gas consumption in non-continuous way reduces overall consumption of helium gas during dehydration and sintering of the glass preform 102.

The present disclosure provides numerous advantages over the prior art. The present disclosure provides an improved method for sintering of the glass preform with reduced helium gas consumption. In addition, the method used to provide the glass preform with reduced cost. Further, the method reduces helium gas consumption by 30 percent without affecting optical parameter of the glass preform.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method of dehydrating a cylindrical body in a furnace, the furnace is defined by a first end and a second end, the method comprising:
    injecting a heat transfer media in the furnace from the first end of the furnace for a first pre-defined time period;
    halting the flow of heat transfer media for a second pre-defined time period, wherein the second pre-defined time period is less than the first pre-defined time period,
    wherein the cylindrical body is dehydrated in presence of the heat transfer media wherein a ratio of the first pre-defined time period and the second pre-defined time period is between 8 to 12 and,
    enabling the heat transfer media to dispense from the second end of the furnace (106).

2. The method of dehydrating the cylindrical body as claimed in claim 1, wherein the heat transfer media is an inert gas.

3. The method of dehydrating the cylindrical body as claimed in claim 1, wherein the cylindrical body is a porous preform for use in manufacturing of an optical fibre.

4. The method of dehydrating the cylindrical body as claimed in claim 1, wherein the injecting comprising:
   injecting the heat transfer media from the first end of the furnace for the first pre-defined time period, wherein the heat transfer media is injected at one of a pre-defined flow rate and a dynamic flow rate; and,
   halting or reducing flow of the heat transfer media for the second pre-defined time period, wherein the second pre-defined time period is less than the first pre-defined time period.

5. The method of dehydrating the cylindrical body as claimed in claim 1, wherein the injecting comprising:
   injecting the heat transfer media from the first end of the furnace for the first pre-defined time period, wherein the heat transfer media is injected at one of a pre-defined flow rate and a dynamic flow rate; and,
   halting or reducing flow of the heat transfer media for the second pre-defined time period, wherein the first pre-defined time period is in a range of 25 to 60 seconds and the second predefined time period is between 1 to 10 seconds.

6. The method of dehydrating the cylindrical body as claimed in claim 1, wherein the furnace (106) is a sintering furnace.

7. The method of dehydrating the cylindrical body as claimed in claim 1, wherein the method enables reduction in heat transfer media consumption of more than 10%.

8. A method of dehydrating a cylindrical body in a furnace, the method comprising injecting a heat transfer media in the furnace, for a first predefined time period; and halting or reducing flow of the heat transfer media for a second pre-defined time period, wherein the first pre-defined time period is in a range of 25 to 60 seconds and the second predefined time period is between 1 to 10 seconds wherein the cylindrical body is dehydrated in presence of the heat transfer media.

9. The method of dehydrating the cylindrical body as claimed in claim 8 further comprising dispensing the heat transfer media from a second end of the furnace (106).

10. The method of dehydrating the cylindrical body as claimed in claim 8, wherein the heat transfer media is an inert gas.

11. The method of dehydrating the cylindrical body as claimed in claim 8, wherein the cylindrical body is a porous preform for use in manufacturing of an optical fibre.

12. The method of dehydrating the cylindrical body as claimed in claim 8, wherein the injecting comprising:
   injecting the heat transfer media from the first end of the furnace at one of a pre-defined flow rate and a dynamic flow rate, wherein the heat transfer media is inserted discontinuously inside the furnace.

13. The method of dehydrating the cylindrical body as claimed in claim 8, wherein a ratio of the first pre-defined time period and the second pre-defined time period is between 8 to 12.

14. The method of dehydrating the cylindrical body as claimed in claim 8, wherein the furnace (106) is a sintering furnace.

15. The method of dehydrating the cylindrical body as claimed in claim 8, wherein the method enables reduction in heat transfer media consumption of more than 10%.

\* \* \* \* \*